(12) United States Patent
Benmore et al.

(10) Patent No.: US 9,327,264 B2
(45) Date of Patent: May 3, 2016

(54) CONTAINERLESS SYNTHESIS OF AMORPHOUS AND NANOPHASE ORGANIC MATERIALS

(75) Inventors: Chris J. Benmore, Naperville, IL (US); Johann R. Weber, Arlington Heights, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 0 days.

(21) Appl. No.: 13/361,164

(22) Filed: Jan. 30, 2012

(65) Prior Publication Data

US 2012/0197005 A1     Aug. 2, 2012

Related U.S. Application Data

(60) Provisional application No. 61/438,176, filed on Jan. 31, 2011.

(51) Int. Cl.
*B01J 19/10*     (2006.01)

(52) U.S. Cl.
CPC ....................... *B01J 19/10* (2013.01)

(58) Field of Classification Search
CPC ........................................................ B01J 19/10
See application file for complete search history.

(56) References Cited

U.S. PATENT DOCUMENTS

| | | | | |
|---|---|---|---|---|
| 5,128,142 | A * | 7/1992 | Mulligan et al. | 424/457 |
| 7,200,493 | B2 * | 4/2007 | Nilsson et al. | 702/19 |
| 2006/0051422 | A1 * | 3/2006 | Colombo et al. | 424/486 |
| 2006/0147540 | A1 * | 7/2006 | Kovacsne-Mezei et al. | 424/489 |

OTHER PUBLICATIONS

J. Leiterer et al., Structure Analysis Using Acoustically Levitated Droplets, 2008, Anal. Bioanal. Chem., 391, 1221-1228.*
A. Biswas, Solidification of Acoustically Levitated o-terphenyl crystals: a Raman Study, 1995, J. Cryst. Growth 147, 155-164.*
Weber et al., Acoustic Levitator for Structure Measurements on Low Temperature Liquid Droplets, 2009, Rev. Sci. Inst., 80, 083904.*
Carrera et al., Effect of Synthesis Techniques on Crystallite Size and Morphology of Lithium Aluminate, 1995, Journal of American Ceramic Society, vol. 78 iss. 4, pp. 933-938.*
Corrigan et al., Physiochemical properties of indomethican and related compounds co-spray dried with polyvinylpyrrolidone, 1985, Drug Development and Industrial Design Pharmacy, vol. 11 iss. 1 & 2, pp. 677-695.*
Klimakow et al., Combined Synchrotron XRD/Raman Measurements: In Situ Identification of Polymorphic Transitions during Crystallization Processes, Mar. 11, 2010, Langmuir Article, vol. 26 iss. 13, pp. 11233-11237.*
J. Leiter, et al., Structure Analysis Acoustically Levitated Droplets, Anal. Bioanal. Chem, (2008), 391: pp. 1221-1228.
J. K. R. Weber, C. A. Rey, J. J. Neuvefeind, C. J. Benmore, Acoustic levitator for structure measurements on low temperature liquid droplets. Review of Scientific Instruments 80, (2009), p. 083904-1 to 083904-8.
A. P. Hammerly, et al., Two-Dimensional Detector Software From Real Detector to Idealised Image or From Two-Theta Scan, High Pressure Research, vol. 14, (1996), pp. 235-248.
X. Y. Qui, J. W. Thompson, S. J. L. Billinge, A GUI-driven program to obtain the pair distribution function from x-ray powder diffraction data, J. Applied Crystallography, 37, (2004), p. 678.
C. J. Benmore, J. K. R. Weber, Amorphization of Molecular Liquids of Pharmaceutical Drugs by Acoustic Levitation, Argonne National Laboratory, Physical Review X1, 011004, (2011), pp. 1-7.
B.C. Hancock, M. Parks, What is the True Solubility Advantage for Amorphous Pharmaceuticals, Pharmaceutical Research, vol. 17,(2000), pp. 397-404.
P. Gao, Amorphous Pharmaceutical Solids: Characterization,Stabilization, and Development of Marketable Formulations of Poorly Soluble Drugs with Improved Oral Absorption, Molecular Pharmaceuticals, vol. 5, No. 6(2008), pp. 903-904.

* cited by examiner

*Primary Examiner* — Ali Soroush
(74) *Attorney, Agent, or Firm* — Cherskov Flaynik & Gurda LLC

(57) ABSTRACT

The invention provides a method for producing a mixture of amorphous compounds, the method comprising supplying a solution containing the compounds; and allowing at least a portion of the solvent of the solution to evaporate while preventing the solute of the solution from contacting a nucleation point. Also provided is a method for transforming solids to amorphous material, the method comprising heating the solids in an environment to form a melt, wherein the environment contains no nucleation points; and cooling the melt in the environment.

13 Claims, 8 Drawing Sheets

Processing of drugs and other materials from supersaturated solutions using containerless processing.

| Material | Use / description | Solvent | Solubility wt % | Diffraction pattern in levitator | Physical levitated form | Diffraction pattern after drying in container | Tg / °C |
|---|---|---|---|---|---|---|---|
| Dibucaine | Anesthetic | Ethanol | 26.2 | Amorphous | Viscous gel | Crystalline | -35 |
| Clofoctol | Antibiotic | Ethanol | 24.3 | Amorphous | Viscous gel | Crystalline | -4 |
| Clotrimazole | Antifungal | Ethanol | 18.6 | Amorphous | Viscous gel | Crystalline | 30 |
| Ketoprofen | Anti-inflammatory | Ethanol | 27.1 | Amorphous | Viscous gel | Crystalline | -3 |
| Probucol | Anti-hyperlipidemic | Acetone | 42.2 | Amorphous | Viscous gel | Crystalline | 27 |
| Ibuprofen | Anti-inflammatory | Ethanol | 24.9 | Amorphous | Viscous gel | Crystalline | -45 |
| Sorbitol | Stabilizer | Water | 48.1 | Amorphous | Viscous gel | Amorphous | -1 |
| Lysozyme | Enzyme | Water | 11.2 | Amorphous | Viscous gel | Amorphous | -87 |
| Aspirin | Painkiller | Ethanol | 13.9 | Crystalline* | Powder | Crystalline | -30 |
| Acetaminophen | Painkiller | Ethanol | 14.2 | Crystalline | Powder | Crystalline | 24 |
| Carbamazepine | Anti-convulsant | Ethanol | 3.3 | Crystalline | Beads | Crystalline | 61 |

FIG. 5

Processing of drugs by containerless laser melting

| Material | Acoustics (AU) | Laser (%) | Melting Temp. (°C) | Melt appearance and characteristics. | Product appearance and characteristics. | Diffraction pattern of recovered levitated sample | Diffraction Pattern of sample melted in container |
|---|---|---|---|---|---|---|---|
| Cinnarizine | 6.8 | 17 | 121 | Clear yellow tinted ~1.5 mm diam. | Spheroid, sticky drop, yellow tint | Amorphous | Crystalline |
| Microzonole Nitrate | 6.9 | 25 | 86 | Dark amber liquid, sublimes, ~2 mm dia. | Dark amber solid. | Amorphous | Crystalline |
| Carbamazepine | 7.0 | Up to 55 | 162 | Clear liquid, some smoke | Clear solid, white/yellow. | Amorphous | Crystalline |
| Clotrimazole | 7.5 | 25 | 145 | Clear liquid, low visc., fast spin, flat sample | Clear/yellow hard solid. | Amorphous | Amorphous |
| Clofoctol | 7.2 | 25 | 88 | Clear liquid, high visc., fast spin, flat. | Clear solid Turns white after 10 mins. | Partially amorphous | Crystalline |
| Probucol | 7.4 | 20 | 127 | Clear liquid fast spin, flat sample | Clear flat brittle solid | Partially amorphous | Amorphous |
| Ketoprofen | 7.8 | 15 | 95 | Clear liquid fast spin | Sticky clear drop | Partially amorphous | Amorphous |
| Dibucaine | 7.2 | 9.5 | 65 | Clear liquid, slight smoke, ~2mm dia. | Syrupy clear drop, turned white & waxy after few mins. | Crystalline | Crystalline |
| Nimesulide | 7.0 | Up to 30 | 150 | Part melt then fell out, very small, yellow, smokes | Yellowish crumbly | Crystalline | Crystalline |

FIG. 6

CONTAINERLESS SYNTHESIS OF AMORPHOUS AND NANOPHASE ORGANIC MATERIALS

PRIORITY

This U.S. Utility patent application claims the benefits of U.S. Provisional Patent Application No. 61/438,176 filed on Jan. 31, 2011.

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

BACKGROUND OF THE INVENTION

1. Field of the Invention

This invention relates to the creation of amorphous materials, and more specifically, this invention relates to the processing of solids and liquids in the absence of nucleation points to create partially glassy or substantially glassy materials.

2. Background of the Invention

Amorphous compounds have enhanced solubility, faster dissolution rates and, in the case of drugs, higher bioavailability compared to their crystalline counterparts. This is due in part to the increased surface wetting of the disordered structure of amorphous materials and changes in the molecular shape or packing arrangements compared to crystalline materials.

Only a limited range of amorphous pharmaceutical compounds are commercially available. This is because synthesizing bulk amorphous forms of a drug is not always possible using conventional pharmaceutical processes, such as melt quenching in containers, freeze and spray drying, milling, wet granulation and the drying of solvated crystals. Also, attempts to make amorphous forms of low molecular weight drugs, such as aspirin (which has a molecular weight of 189 Daltons) have proven elusive.

State of the art methods for producing amorphous materials are inefficient, with a yield of less than 75 percent of the starting material being converted. Typically, about 40 percent yields are realized. Those methods are frequently relegated to small scale production of less than 500 milligrams.

Developing amorphous forms is becoming increasingly important due to the emergence of new drugs, many of which are virtually insoluble in their crystalline form.

A need exists in the art for a method for producing amorphous compounds at high conversion rates (i.e., above 75 percent). The method should be applicable to a wide range of target compounds. The method should also be applicable to convert compounds initially found in different non-glassy phases to amorphous phases which exhibit long shelf lives.

SUMMARY OF INVENTION

An object of the invention is to provide a method for producing amorphous materials that overcomes many of the disadvantages of the prior art.

Another object of the invention is to provide a room temperature method for producing amorphous materials from solutions or solid forms. A feature of the invention is confining solid and/or liquid phase material to a containerless environment while simultaneously cooling the material or evaporating the solvent from the solution. An advantage of the invention is that no extrinsic nucleation sites or surfaces exist to cause crystallization of the materials, such that the resulting amorphous materials are substantially free from crystallized material.

Yet another object of the present invention is to provide substances in shelf-stable, substantially completely amorphous form. A feature of the invention is that at least in several cases, no crystals are detected in the amorphous form, as viewed with high energy x-rays. In an embodiment of the invented process, amorphous substances are synthesized which are at least 50 percent amorphous, and preferably between 50 and 100 percent amorphous, and most preferably more than 85 percent glassy. Typical results of the process are materials having between about 95 and 100 percent amorphous phase. Embodiments of the invention have yielded compounds that are from 99 to 100 percent amorphous. An advantage of the invention is increased reactivity (such as bioavailability) of the compounds from about 2-times to 10-times that seen in crystalline counterparts.

Still another object of the present invention is to provide a versatile method for producing amorphous materials. A feature of the invention is the use of either transient or steady state containerless environments to produce the materials. An advantage of the invention is that the containerless environs can enable the production of stable amorphous phases from materials heretofore difficult or virtually impossible to make into amorphous forms using state of the art synthesis methods. Another advantage of the invented method is that it enables the production of bulk-size (more than 300 grams, and in some embodiments more than 500 grams) amorphous materials when certain containerless modalities, such as drop tubes, are utilized.

Briefly, the invention provides a method for producing neat single phase amorphous materials or a mixture of amorphous compounds, the method comprising supplying a saturated solution containing the compounds; and allowing at least a portion of a solvent of the solution to evaporate while preventing the solute of the solution from contacting a nucleation point. From partial to substantially complete evaporation of the solvent is suitable. Partial evaporation may result in solvation of the final material to form, for example, a hydrated or other solvated form.

Also provided is a method for transforming solids to amorphous material, the method comprising heating the solids in an environment to form a melt, wherein the environment contains no nucleation points; and cooling the melt in the environment.

The invention further provides system for amorphizing materials, the system comprising a levitator for suspending the materials; a means for melting the suspended materials or removing solvents which are solvating the suspended materials; and a means for collecting the melted or solvent-less materials while preventing contact between the materials and nucleation points.

Environments which contain no extrinsic nucleation points include, but are not limited to, levitation systems, drop tubes, drop towers, some weightless environments that enable container-less processing, free falling drops, aerosols, and combinations thereof.

BRIEF DESCRIPTION OF DRAWING

The invention together with the above and other objects and advantages will be best understood from the following detailed description of the preferred embodiment of the invention shown in the accompanying drawings, wherein:

FIG. 5 is a table of experimental parameters for forming amorphous-phase drugs from supersaturated solutions, in accordance with features of the present invention;

FIG. 6 is a table of experimental parameters for forming amorphous-phase materials via containerless melting, in accordance with features of the present invention;

DETAILED DESCRIPTION OF THE INVENTION

The foregoing summary, as well as the following detailed description of certain embodiments of the present invention, will be better understood when read in conjunction with the appended drawings.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 8:
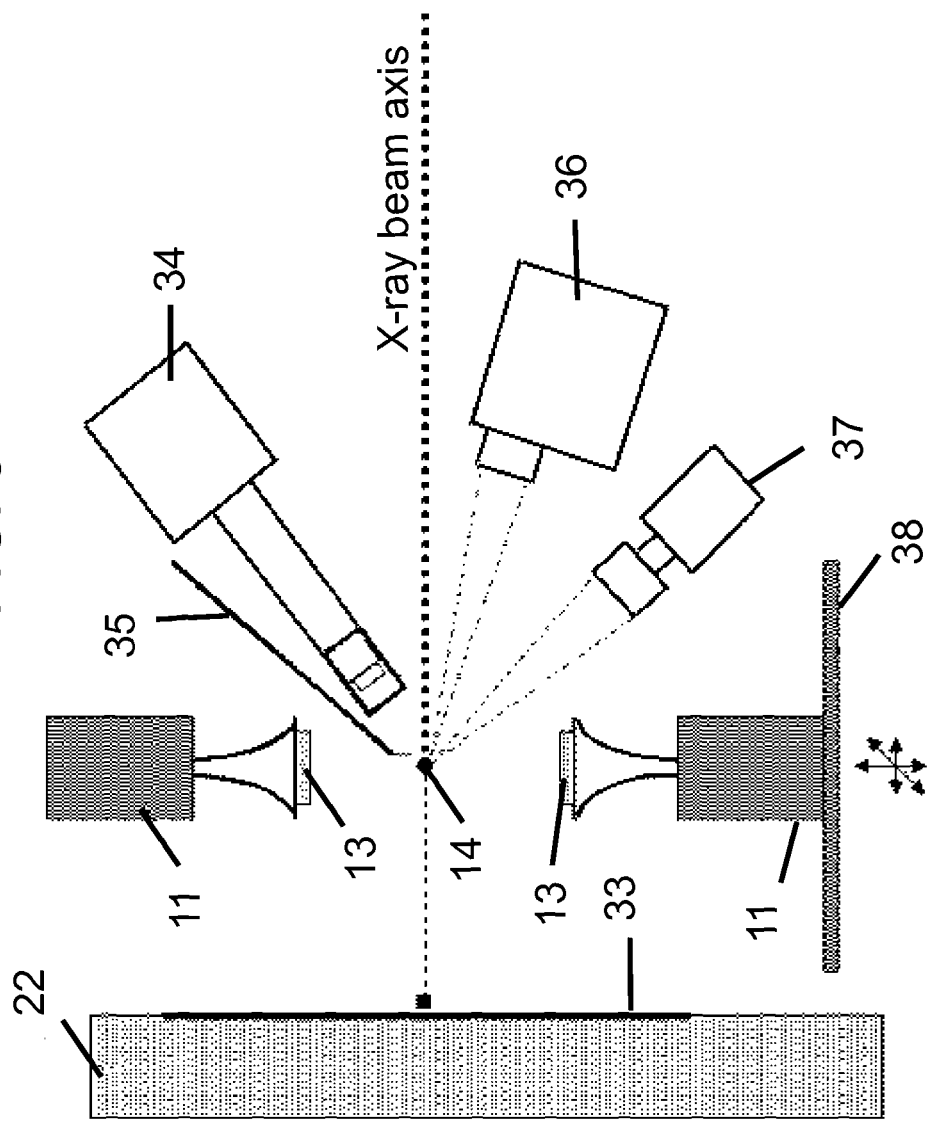
FIG. 8 is a depiction of an apparatus for x-ray diffraction analysis of materials formed in the invented weightless apothecary, in accordance with features of the present invention.

The inventors have discovered that acoustic levitation produces amorphous forms of a variety of organic compounds having different glass forming abilities. In this specification, the term "amorphous" means that the material does not exhibit diffraction Bragg peaks in the x-ray diffraction pattern that otherwise results from a repeating, long range periodic atomic or molecular ordering. It is also noted that the term "vitreous", "vitrify", "vitrification", "glass" and "glassy" are variations of amorphous for the purposes of this specification and may be used interchangeably. The x-ray diffraction patterns were obtained using very high flux, high energy x-rays that are capable of detecting even minute (<1%) traces of crystalline materials. A configuration to enable x-ray beam analysis is depicted in FIG. 8 and discussed infra.

The invention provides amorphous materials having enhanced solubility for pharmaceutical applications compared to crystalline counterparts. Solubility is increased 50-fold or more, depending on the molecule being amorphized. Solubility ratios of amorphized to crystalline forms ranged from about 2:1 to 50:1, and more typically from about 5:1 to 20:1. High energy x-ray experiments show that several viscous gels form from saturated pharmaceutical drug solutions after 10 to 20 minutes of levitation at room temperature. Most of the gels are able to be frozen in solid form without losing their glassy (amorphous structure). Heating of ultrasonically levitated drugs, for example melting solid material with a laser, results in amorphous or vitreous (i.e. glassy) forms of the subsequent molecular liquids, said amorphization or vitrification not attained using conventional methods.

The invention provides containerless synthesis of amorphous drug compounds from feedstock material supplied as solids, solutions, supersaturated solutions, liquids or supercooled liquids. This feedstock material may be crystalline in its initial form. As such, the invention facilitates the production of amorphous material from crystalline feedstocks.

A myriad of containerless processing modalities are suitable, including, but not limited to steady state systems (such as acoustic and aerodynamic levitation techniques), and transient systems (such as drop tubes, drop towers, free falling drops, and aerosols).

This process is applicable to a variety of chemical structures having different functions. For example, the process is applicable to the production of cosmetic- and pharmaceutical-molecules. It can be used for the synthesis of amorphous preparations of peptide and oligonucleotide (e.g., anti-sense) drugs.

An embodiment of the invention enables the preparation of amorphous compounds having a molecular weight generally between approximately 50 Daltons and 7000 Daltons, for example between about 100 and 1000 Daltons, and typically approximately 500 Daltons.

Generally, amorphous compounds generated by the invented process are free of significant structure having dimensions up to a few hundred Angstroms. The invented process generates amorphous compounds free of structure having dimensions of greater than 60 Angstroms. Preferably, the compounds are free of significant structure having dimensions greater than 30 Angstroms, and most preferably are free of significant structure having dimensions greater than 15 Angstroms. "Significant structure" is construed herein as crystals or partially formed crystals. An example of significant structure includes the presence of crystals or partially formed crystals comprising more than 0.1 to 25 weight percent of the final product.

Specifically, the containerless processing technique enables the synthesis of solution-derived, and difficult to vitrify, or melt-quenched-derived amorphous forms of drugs. The method is applicable to a wide range of chemical structures with varying pharmaceutical uses.

Surprisingly and unexpectedly, the inventors found that containerless processing results in the production of amorphous materials generally, for example organic materials, many of which retain much of their new-found amorphous nature over time. Such containerless processing avoids extrinsic heterogeneous nucleation by surface contact that would normally occur in containers, thereby providing a means for super cooling or super saturating fluids well beyond equilibrium conditions. The feedstock materials can be homogeneous in that they are comprised of all one phase (i.e., all liquids, or all solids) or of a heterogeneous mixture (i.e., solids and liquids present together in the levitation environment). In the case of solid phase feedstocks, those are vitrified by laser heating (or other methods of melting) while the sample resides in the acoustic levitator.

In an embodiment of the invented process, both the super saturation stage and the laser heating stage are monitored by in-situ x-ray diffraction measurements, the former during the solvent evaporation, and the later during melting and subsequent cooling and super cooling of the levitated melts.

Levitation Process Detail

An embodiment of the invention utilizes acoustic levitation methods to enable generally symmetrical entities (i.e., spherical and elliptically-shaped feedstock such as liquid droplets between about 1.5 to 5 mm in diameter and solid particles) to float freely without coming into contact with a surface. Generally, each of the droplets comprises 10 to 20 milligrams of material to be amorphized. A plurality of droplets (e.g., up to about 10) are levitated in the current experimental set up, such that 200 mgs of material can be amorphized per process run when levitators are utilized. As such, the size and number of droplets increases with more powerful levitation equipment. (As noted supra, when drop tubes are utilized, 300 to 500 gram batches are realized.) A myriad of configurations, such as irregularly shaped (i.e., nonsymmetrical particles) also can be levitated.

Figure 1:
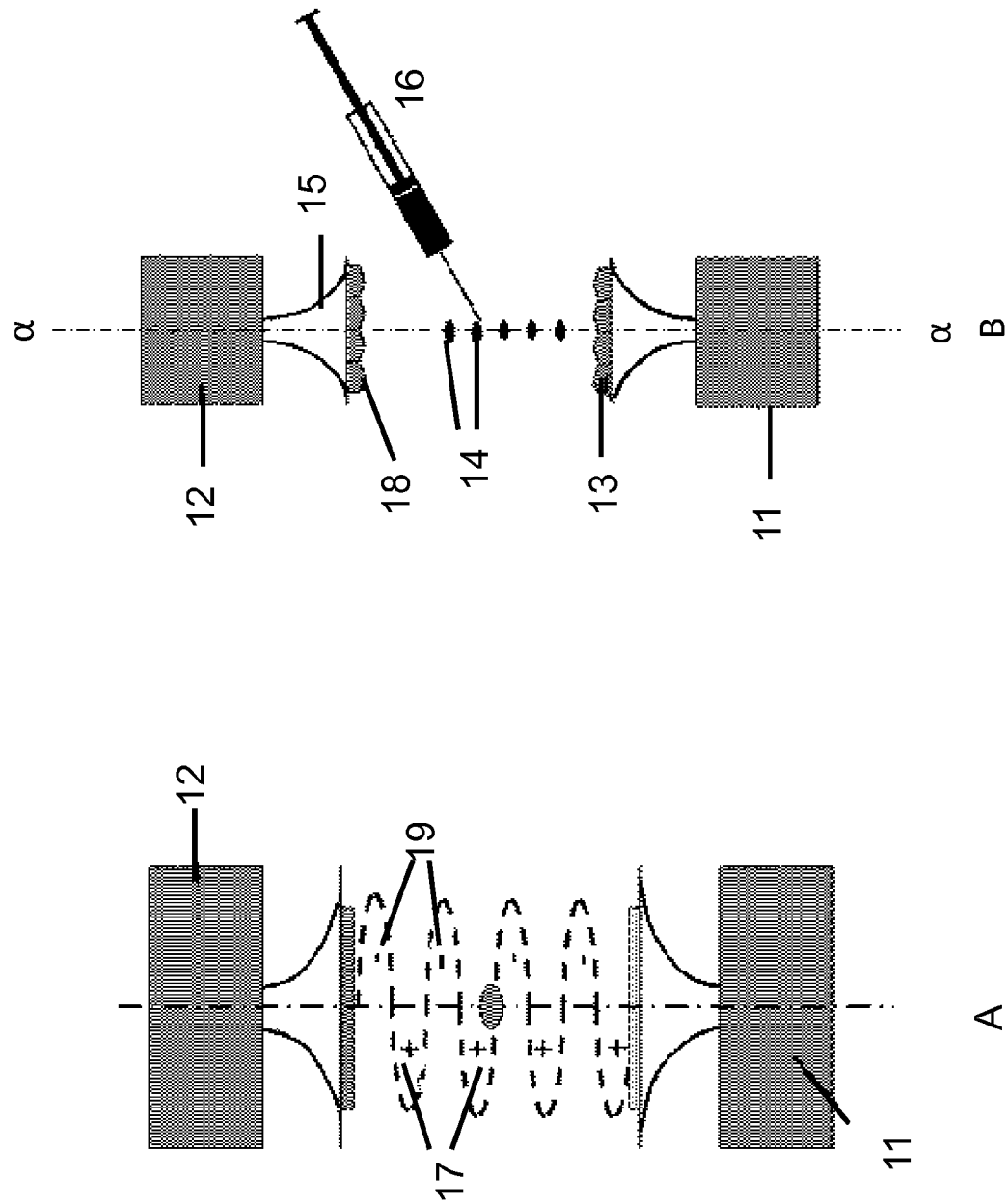
FIG. 1A is a schematic diagram of acoustic levitation.
FIG. 1B is a schematic diagram of the invented system, in accordance with features of the present invention.

The process can be performed at temperatures ranging from about −40° C. to +200° C. Acoustic levitation, schematically depicted in FIG. 1A, is utilized to suspend and homogeneously mix matter throughout a medium by using acoustic radiation pressure from intense sound waves traversing the medium. This is possible because of local pressure gradients caused by interaction of sound waves that can provide a force to overcome the weight of the suspended material. A salient feature of this embodiment of the invention is that the material being amorphized is not heated from external sources of heat during processing.

As depicted in FIG. 1A, both a sound velocity wave 20 and a sound pressure wave 22 out of phase with the velocity wave are utilized to suspend the feedstock material 14. The waves contain compression regions 17 and rarefaction (decompression) regions 19 within the levitation field.

Acoustic levitation can operate over a wide range of frequencies and in various configurations, whereby the chamber configuration often dictates the frequencies utilized. Suitable wavelengths for the invented process are from approximately 1 millimeters (mm) to 10 mm. Frequency determines wavelength and the size of the wavelength utilized is proportional to sample size—with low frequencies (i.e., larger wavelengths) levitating larger objects. Typical frequencies range from between 1000 cycles per second (Hz) and 100,000 Hz, with those between 10,000 and 70,000 Hz preferred. Acoustic levitation frequencies of approximately 22,000 (Hz) were utilized in some experiments.

In an embodiment of the invention, droplets are formed by introducing a fluid into an active levitation zone, i.e., a chamber in which levitation forces are already established. Solution introduction can be made with syringes, pipettes, or valve-controlled pressurized conduits. In instances where solid samples serve as the feedstock, the solid is introduced into the levitation chamber using a mesh support such as a spoon, or via a holding means such as a tweezers, such support or holding means residing in the chamber long enough for the levitation forces to support the solid sample on their own.

FIG. 1B is a schematic diagram of a containerless system, designated as numeral 10, using an acoustic levitator. A transducer 11 (or a plurality of transducers) generates an acoustic frequency to be reflected by one or more reflectors 12, resulting in suspension of feedstock material 14 between the transducer(s) and reflector(s). FIG. 1B depicts a transducer opposed to a reflector.

In an embodiment of the process, the feedstock materials are arranged collinearly with a longitudinal axis α formed by a transducer in opposition to a reflector and levitated between the transducer and the reflector. The collinearly arranged feedstock droplets or solid masses move in tandem when the phases of acoustic signal are changed.

Also, in an embodiment of the invention, additional acoustic transducers may be placed such that they produce forces in difference planes relative to the longitudinal axis discussed supra. This can enable manipulation of samples in multiple directions in order to process them in a sequential manner.

In an embodiment of the invention, both a tip 13 of the transducer 11 and a tip 15 of the reflector terminate in wavelength dampening material 18, such material comprising reversibly deformable material such as foam, rubber, acoustic absorbing materials generally, and combinations thereof. Levitation energy is supplied via a myriad of commercially available transducers, such as the Single-Axis Acoustic Levitator, manufactured by Materials Development Incorporated, Evanston, Ill.

As shown in FIG. 1B, an embodiment of the system 10 is an open air configuration, which is to say that no physical barrier exists between the levitation zone and ambient environment. The ambient environment can be any environment the researcher determines, such that the system can be placed in an enclosure that would allow control of the environmental factors such as pressure, temperature, humidity, ambient particulate load, etc. Suitable pressures are those which allow for presence of a gas (e.g., about 0.1 atmospheres or above). Generally, complete vacuum conditions are less desirable. While any positive pressures are suitable, pressures below about 100 atmospheres are typically accommodated by the equipment utilized in the invented system, with pressures between 0.25 and 50 atmospheres preferred, and pressures between about 0.5 and 5 atmospheres most preferred. Generally, the use of controlled atmospheres or the operation of the process in a glove box, a fume hood, a clean room or a cold room is suitable. Additionally, the process can be conducted in an open air environment, i.e., at room temperatures or factory floor temperatures and at ambient pressures and humidity levels. This facilitates the unhindered loading of the levitation zone with a feedstock delivery vehicle, such as a syringe 16, and the harvesting of product, with for example a mesh spoon (whereby the spoon is simply inserted underneath or beside the levitating material, then positioned to contact the material for removal from the levitation field), or pressurized hopper (whereby a positive pressure fluid blows or otherwise forces the levitated material out of the levitation field and into a hoper or other conduit. Other harvesting means includes a solid substrate, such as a film, dish, or spatula which is positioned beneath the levitated material. When this happens, the field is interrupted and the material falls onto the substrate. Other harvesting means, such as vacuum tubes, or tweezers are also suitable.

Depending on purity requirements of manufactured amorphous product, closed systems are envisioned to prevent contamination of still-forming amorphous masses with air-borne detritus. Otherwise, such detritus may serve as nucleation points, thereby compromising shelf life of the amorphous materials finally formed or even preventing formation of amorphous materials.

High energy x-ray diffraction measurements were also performed on pure glassy pharmaceutical solids, vitrified by laser heating in an acoustic levitator.

Candidate Selection Detail

Suitable materials as levitation candidates can be those substances (organic or inorganic) with a low glass forming ability. Such forming ability of a material is discussed in terms of 'fragility'. (Those materials with a strong tendency to form glasses are referred to as having a low fragility, i.e., below a fragility number of about 35. Those which are difficult to glass are said to have a high fragility, i.e., materials with fragilities of 100 or more.) The invented method enables amorphization of materials with intermediate- to high-fragility characteristics, i.e., fragility values at or above 50. In these materials, the temperature dependence of their viscosity deviates from Arrhenius behavior (i.e., any molecules which do not easily form glasses).

The inventors developed a screening process to determine suitable candidates for levitation. For example, many materials are selected based on their ability to form viscous fluids before crystallizing when concentrated solutions of the materials are left to dry in a container. This screening embodiment comprises evaporating saturated solutions of materials, such as drugs, in containers and periodically examining the viscosity of the liquid, the gel, and/or to see if it crystallizes. Compositions that did crystallize when they were processed in this way are considered to be good candidates for processing by containerless techniques.

The evaporating containers can be any solid substrate with the container set out in an ambient environment (e.g., room temperature, environmental pressure, such as standard pressure and temperature). In addition, such a process could be performed in a controlled environment, for example under a reduced pressure and/or over a controlled range of temperatures that would affect the evaporation of solvents.

The inventors found that the best levitation candidates are those materials that crystallize slowly (more than about 5 seconds) in a container. Slow crystallizers allow the invented method to quench the material into a glass before crystallization occurs. Fast crystallizers (e.g., crystallization occurring in a few seconds) are less preferred as these fast crystallizers make it more difficult to glass using the invented method.

As part of the screening process, the candidate material need not be heated to expedite drying, but alternatively can be. Also, drying does not have to be complete. Drying can be performed in air, in a vacuum or a glovebox.

Exemplary crystalline pharmaceutical drugs Clotrimazole, Ibuprofen, Dibucaine, Ketoprofen and Clofoctol were dissolved in pure anhydrous ethanol. Probucol was dissolved in acetone. Generally, solvent/solute combinations are chosen such that the solvents have a higher vapor pressure than the solute.

Supersaturated Fluid Container-less Processing Detail

Saturated solutions were prepared by adding material to the solvent that was held in a vial in an ultrasonic mixing bath. Solute was added until no more would dissolve and the resulting solution was filtered to remove un-dissolved solids. Weighed samples of each solution were dried out to determine the solute concentration. The solvents were chosen because of the high solubility of the compounds.

The resulting solutions were synthesized into amorphous gels or solids using an acoustic levitator operating at a frequency of about 22 kHz, as noted supra. Exemplary levitators are described in detail in J. K. R. Weber, C. A. Rey, J. Neuefeind and C. J. Benmore. Rev. Sci. Instr. 80 (2009) 083904, the entirety of which is incorporated herein by reference.

Once the material is levitated, the solvent starts to evaporate due to its relatively higher vapor pressure compared to the solute molecules. The rate of evaporation can be controlled by adjusting the temperature so that the solvent's vapor pressure will change. Generally, suitable chamber temperatures are those which achieve substantial solvent loss before solute loss or destruction, per the Antoine Equation. The Antoine Equation is a vapor pressure equation, derived from the Clausius-Clapeyron equation, and describes the relationship between vapor pressure and temperature for pure components. It's basic expression is as follows:

$$\log_{10} p = A - B/(C+T)$$

where p is the vapor pressure, T is temperature and A, B and C are component specific constants which vary from substance to substance. Antoine coefficients for many substances are tabulated in *Lange's Handbook of Chemistry* (12$^{th}$ Ed. McGraw-Hill, New York 1979), the entirety of which is incorporated herein by reference.

Experiments were conducted with the particular levitator interior maintained at about 25° C. Suitable ranges of this particular levitator range from −40° C. to +40° C. ambient gas temperature. Evaporation of substantially all of the solvent is not always necessary to form final product. For example, final product is obtained when about half of the solvent evaporates. In many instances, the formation of a solvated complex with the target amorphous moiety is suitable. Existence of solvated complexes is confirmed when the mass of the product formed is greater than the initial mass of the solid drug. In an embodiment of the process, the forming product is periodically weighed or otherwise observed to determine optimum solvation point. Solvated complexes display spectra in x-ray diffraction view graphs that differ from non-solvated complexes. As such, the operator of the process compares the spectra of the sample with a library of spectra to determine solvation points.

Since acoustic levitation avoids nucleation of crystals that otherwise occurs at the interface between a liquid and a solid surface, the solutions are easily supersaturated. After a period of about 10 to 20 minutes in the levitator, the concentration of solute increased sufficiently for the liquids to become extremely viscous, resulting in amorphous gels. Embodiments of the invented process include levitation at ambient temperatures and pressures.

Several amorphized samples were quenched by trapping them in a small volume of liquid quenchent (for example liquid nitrogen, which is maintained at about −196° C.). The quenched samples were stored at temperatures ranging from about −20° C. to 25° C. Exemplary amorphized drugs, such as Cinnazirine (having a glass transition temperature $T_g$ of 7° C.), Miconazole Nitrate ($T_g=1°$ C.), Pobucol ($T_g=27°$ C.), Clotrimazole ($T_g=30°$ C.), remained substantially stable over a period of months as noted in Table 1.

In general, cooling the product makes it more stable. Shelf life is therefore extended by cooling them. For example, samples stored within a few degrees of, or below their glass transition temperatures exhibit shelf lives in excess of approximately 3-4 months. For bulk storage of amorphized materials, samples are stored at temperatures below freezing (0° C.) if the samples are to be kept more than 150 days. However, for short term storage (e.g., less than 150 days), stability is achieved at storage temperatures up to about 20° C.

X-ray diffraction patterns indicate that Clotrimazole, Ibuprofen, Ketoprofen and Clofoctol remain amorphous during exposure to temperatures ranging from between about −200° C. and 25° C.). Furthermore, the amorphous forms could be stored for at least three weeks at room temperature in glass or in contact with a relatively inert flexible substrate such as film. (Suitable film is polyimide film, e.g., Kapton from Dupont.)

Generally, once formed, the amorphized samples retain their glassy nature upon contact with hard surfaces such as films, glass containers, probes, spatulas and the like. Surprisingly and unexpectedly, the inventors found that two samples supported on a surface such as a film can be manipulated, stuck together and even mixed together without danger of crystallization. This provides a means to agglomerate samples to create bulk sizes for easier handling and shipping.

Storing in an environment maintained at about 5° C. extends the shelf life. Storing the samples in air does not affect shelf life such so that the samples can be kept in open containers with exposure to ambient air. As noted supra, stabilizers added to the amorphized material also provide a means for extending shelf life.

Myriad types of materials are candidates for processing using the invented weightless process. Suitable genuses of material include, but are not limited to pharmaceuticals, antibiotics, cosmetics, foods such as dairy products, and combinations thereof. Table 1 below depicts the sample stability over time for various amorphous materials produced using the invented method.

TABLE 1

Shelf Lives of substantially pure Amorphized Materials Stored at 4° C.

| | $T_g$ | Time (months) | | | | | | | |
|---|---|---|---|---|---|---|---|---|---|
| | (° C.) | 0 | 1 | 2 | 3 | 4 | 5 | 6 | 7 | 8 |
| Cinnazirine | 7 | A | A | A | A | A | A | A | A | C |
| Miconazole Nitrate | 1 | A | A | A | A | A | A | A | A | |
| Carbamazepine | 61 | A | A/P | A/P | A/P | A/P | P | P | C | C |
| Clotrimazole | 30 | A | A | A | P | P | P | P | P | |
| Probucol | 27 | A | A | A | A | A | | | | |
| Ketoprofen | −3 | A | A | C | C | C | C | C | C | |

A = Fully amorphous, P = Partially Amorphous, C = Crystalline.

The 2D detector data were corrected for variations in dark current and the sample to detector distance determined by levitating a polystyrene ball coated in polycrystalline $CeO_2$ powder. The 2D sample data were corrected for background, beam polarization, detector geometry and integrated to 1D using the software FIT2D, which is discussed in A. P Hammersley et al., High Pressure Research 14, 235 (1996) and incorporated herein by reference. The FIT2D software is available without charge from the European Synchrotron Radiation Facility, Grenoble France and available on line. The x-ray structure factors, S(Q), were obtained up to a maximum Q ~20 Å-1 using the program PDFgetX2, which is discussed in X. Y. Qiu, J. W. Thompson, and S. J. L. Billinge, J. App. Cryst. 37, 678 (2004), and incorporated herein by reference. PDFgetX2 is publically available from Michigan State University, East Lansing, Mich. and available on line. This software performs corrections for oblique incidence, energy dependent detector efficiency absorption and multiple scattering.

Super Cooling Process Detail

Approximately 2 mm diameter spheres of the drugs Cinnarizine, Carbamazepine, Miconazole Nitrate, Probucol, Clofoctol and Ketoprofen were melted, using about 1-5 Watts heating power from a laser beam 34 (as illustrated in FIG. 8). It is estimated that about 25 percent of the laser beam power was absorbed by the samples depending on alignment and sample size. In all cases, laser heating caused instabilities in the levitation, mainly in the form of radial oscillations of approximately ±2 mm in magnitude or fast spinning. These radial oscillations can provide a means to enhance mixing of the amorphizing samples with other moieties positioned within the levitation field, such as pH-changing agents. Generally, the moieties are positioned lateral from the amorphizing samples such that the samples periodically contact the moieties during radial expansion and contraction.

The liquid droplets, generated by laser heating, generally formed a spherical to pancake shape and required a higher acoustic power to levitate than the starting solid forms, indicating a low surface tension.

In an embodiment of this process, a solid piece of material is first levitated and then heated until the solid melts. Any means for heating the solid is suitable, including heating the entire interior of the air space between the termini 13, 12 of the levitator and reflector respectively. Other heating means include hot walls, an acoustic levitation furnace, beam heating the solid material for example with a laser (either continuously or intermittently), using infrared radiation, microwaves, or a combination of these heating modalities. Methods for heating the interior of the levitator include placing heating elements within the levitator, or circumscribing the exterior walls of the levitator with a heating element so as to allow the heat to conduct through the walls of the levitator to warm the interior space of the levitator.

Once melted, the sample is allowed to cool.

The levitated melts were acoustically translated out of the laser beam and the recovered levitated products were stored in the refrigerator prior to the x-ray experiments. In an embodiment of the process, a levitator with a plurality of transducers is utilized such that the drive phase is shifted between the two to provide a means for moving the samples in the levitation field. A similar result is achieved by adjusting the laser beam power electronically.

Extraction of the amorphized samples from the levitation field is facilitated by using a scoop or spatula placed under the levitated sample so as to break the lifting force. The sample settles into the scoop or spatula and is transferred to a vial. When quenching of the sample is required, a dish of liquid nitrogen is positioned between the reflector and the transducer tips (or between a plurality of transducer tips in instances where a plurality of transducers are used to levitate the sample). The dish so placed breaks the levitation forces suspending the sample, thereby allowing the sample to settle into the dish.

Upon harvesting the sample from the levitation fields, the samples maintain their glassy character, even when the amorphized material contacts surfaces of storage containers. As such, the invented process enables the creation and storage of amorphous materials even when the storage means includes nucleation surfaces heretofore responsible for causing crystallization of target compounds. After formation in a containerless reactor system, the amorphized material retains its glassy nature even upon subsequent contact with a container.

NMR measurements detected no evidence of thermal decomposition of laser beam-heated samples. As such, laser heating does not substantially decompose or otherwise modify the molecules prior to amorphization.

The diffraction patterns of the drugs processed in this manner were compared to the same starting materials gently heated with the laser beam in a typical reaction container, such as a copper hearth.

Figure 2:
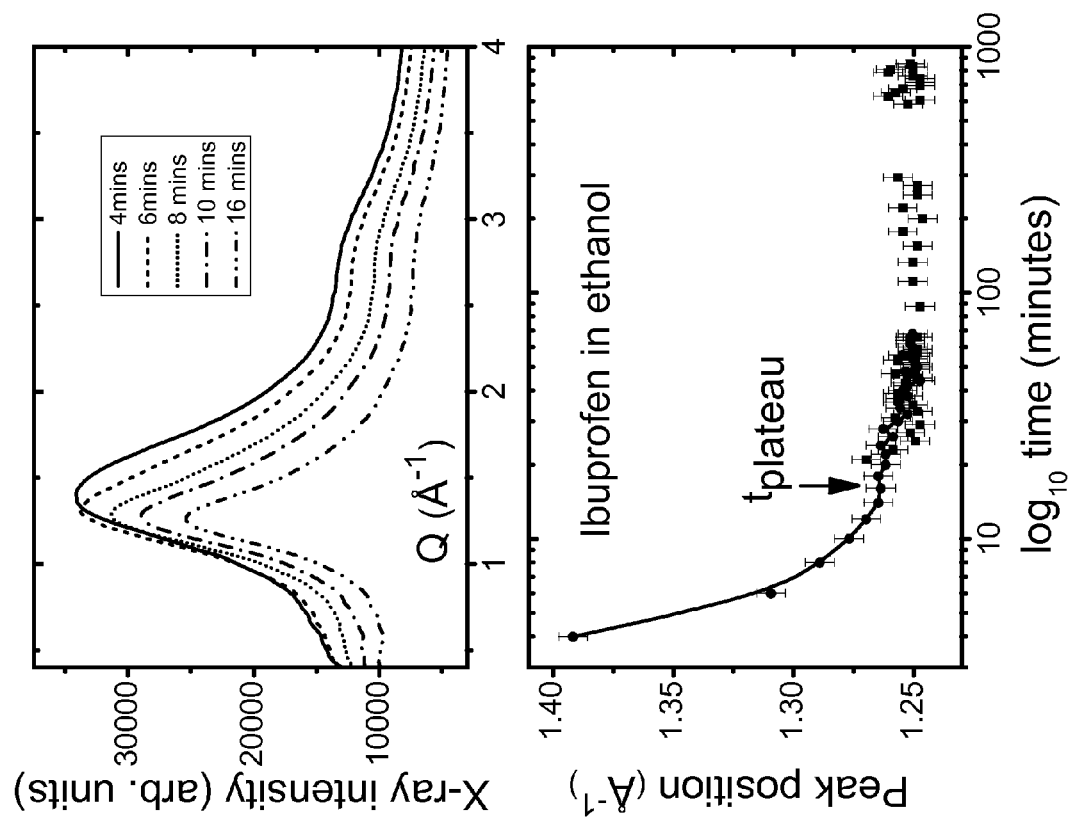
FIG. 2 is a depiction of x-ray intensities of forming glassy compounds and the time of formation of glassy compounds, in accordance with features of the present invention.

By following the position of the principal peak in the x-ray diffraction patterns for all the supersaturated solutions, the amorphization process was investigated as a function of time. For example, the concentrated solution and time-resolved changes leading to the formation of an amorphous gel for Ibuprofen in ethanol are illustrated in FIG. 2. The top graph of FIG. 2 shows the x-ray intensity varying over time as the solvent evaporates from a supersaturated droplet of Ibuprofen in ethanol. The graph shows the measured x-ray intensity versus momentum transfer (which is related to scattering angle). The fact there are no sharp (needle like) peaks in the measured spectra indicates the materials are completely amorphous. Peak shrinkage indicates that the solvent is evaporating and the structure is changing and becoming more amorphous with time.

The bottom graph of FIG. 2 shows the position of the principal peak followed as a function of log time. As the principal peak position reached the beginning of a plateau at time $t_P$, the amorphous gels were found to form through the evaporation of approximately 50 percent of the solvent droplet by volume. After the plateau is reached in about 20 minutes, only minimal changes in structure were observed, even after more than 14 hours of in situ measurements on the levitated drop. Some of the samples prepared using the invented process maintained their amorphous form for at least three weeks.

Figure 3:
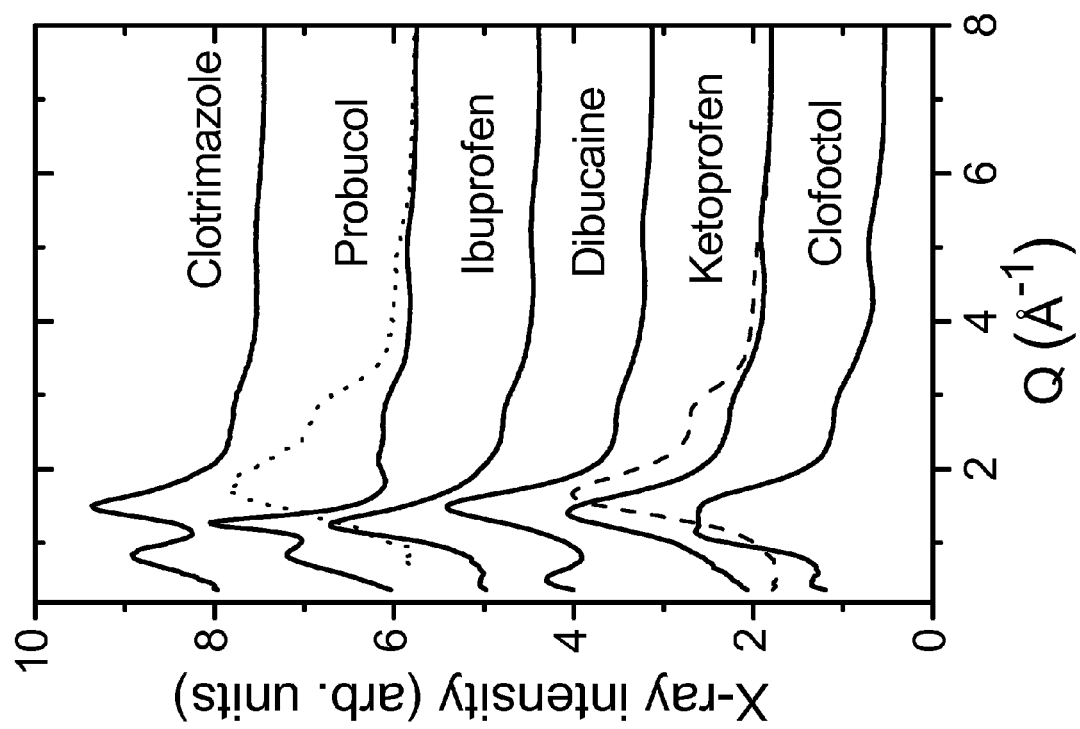
FIG. 3 is a depiction of x-ray diffraction patterns for glassy compounds formed from supersaturated solutions confined to a levitator, in accordance with features of the present invention.

FIG. 3 depicts the background corrected x-ray diffraction patterns for six amorphous gels formed from supersaturated solutions measured in situ using an acoustic levitator. Specifically, the backgrounds of corrected x-ray intensities for amorphous Clotrimazole, Probucol, Ibuprofen, Dibucaine, Ketoprofen and Clofoctol at time $t_P$ are shown in FIG. 3. The background corrected x-ray diffraction patterns for six amorphous gels formed from supersaturated solutions were measured in-situ using the acoustic levitator. These x-ray spectra were taken after 14 minutes of levitation for Clotrimazole, after 20 minutes for Probucol, 16 minutes for Ibuprofen, 10 minutes for Dibucaine, 16 minutes for Ketoprofen and 21 minutes for Clofoctol. The broken lines represent the x-ray diffraction pattern of the pure solvents used; ethanol (dashed line), acetone (dotted line).

The structure and properties of stable or meta-stable amorphous gels are often quite different from their crystalline counterparts. Therefore at, or just prior to, $t_P$ the gels were quenched into a small dish of liquid nitrogen in an attempt to preserve the amorphous forms. The cold solid samples were quickly recovered and re-levitated. In-situ x-ray structure measurements were then made on the cold solids as they warmed back to room temperature.

The chart in FIG. 5 provides experimental parameters of compounds from supersaturated solutions using containerless processing.

For three other drugs, namely Cinnarizine, Carbamazepine and Miconazole Nitrate, neat (e.g., substantially pure) samples were fully vitrified in an acoustic levitator using laser heating. These liquids were quenched to produce glasses, while the corresponding liquids left to cool in containers formed crystalline solids. The x-ray structure factors are shown in FIG. 4.

Figure 4:
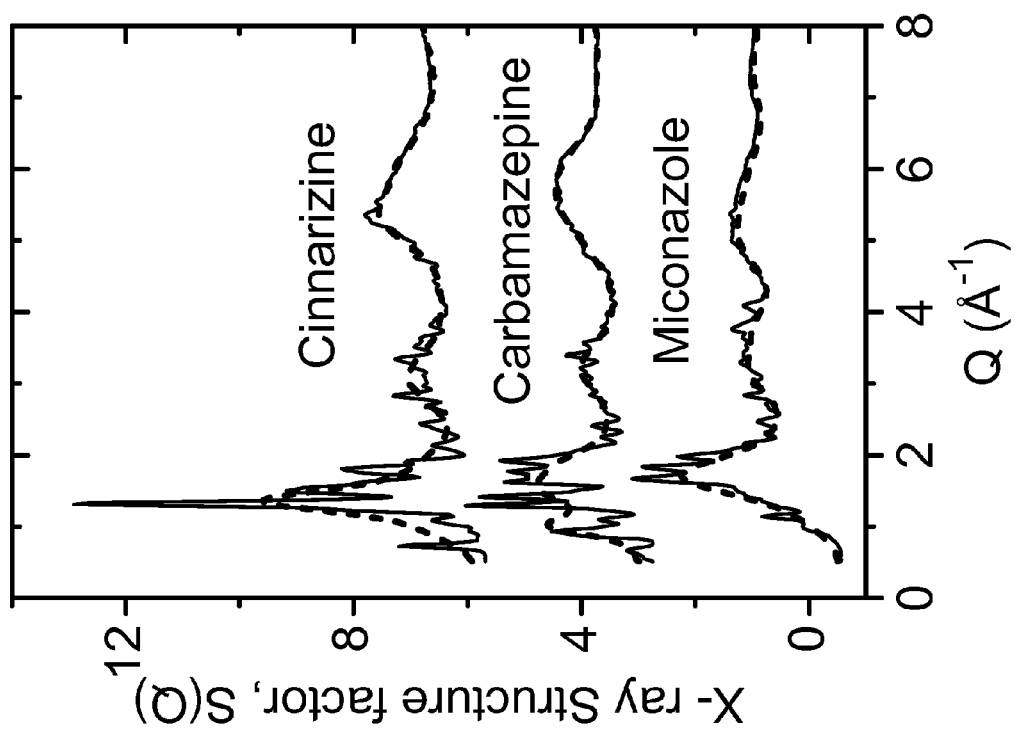
FIG. 4 is a depiction of x-ray diffraction patterns for glassy compounds formed from materials melted in a levitator, in accordance with features of the present invention.

FIG. 4 depicts the x-ray structure factors, S(Q) for three pure pharmaceutical drugs melted in the levitator with a laser and quenched to room temperature (thick red lines). In one embodiment, the quenching was done with air, although other suitable fluids include relatively inert gases, cold gas streams, liquefied gases, and cold inert liquids such as liquids inert to the substance being transformed. Exemplary cold inert liquids include liquid nitrogen and other quenchent. These are compared to the same starting materials melted and allowed to cool in a copper hearth (thin black lines). The Bragg peaks observed in the materials cooled in containers indicate long range ordering in real space, and while the well defined molecular bonds persist in the glassy pair distribution functions, the local packing arrangement of molecules is completely broken down by about 15 Å. The sharp Bragg peaks of the black curve in the graph is indicative of crystal ordering, whereas the smooth dashed line connotes the lack of significant structure in the formed glasses, particularly above 15 Angstroms. The x-axis represents momentum transfer in Angstroms. The y-axis is dimensionless.

The chart in FIG. 6 provides experimental data of compounds produced via containerless laser melting.

In an embodiment of the invented process, stabilizers are added to the nucleation-free formation zone, typically when the feedstock of the target substance is added. These stabilizers provide further means to inhibit crystallization. Alternatively, or in addition, stabilizers are premixed with the drug prior to subjecting the feedstock to the invented weightless process.

In general, the stabilizers (often long polymers more than 200 monomers in length) act by preventing bonds forming between the atoms and molecules of the material that is trying to crystallize. They provide a means to dilute or otherwise disrupt ordering of the material so that the amorphous form is retained.

Suitable stabilizers are a myriad of polymers, including, but are not limited to, polyvinyl pyrrolidone (PVP), Polyvinyl pyrrolidone-covinyl acetate, poly acrylic acid, poly vinyl alcohol, polyethylene glycol, hydroxypropyl-methyl cellulose, and combinations of these. It is to be understood that the above description is intended to be illustrative, and not restrictive. For example, the above-described embodiments (and/or aspects thereof) may be used in combination with each other. Specifically, the inventors envision an embodiment of their process producing materials having a crystalline center encapsulated in an amorphous shell. Some of these materials may have a crystalline center with varying degrees of disorder.

Figure 7:
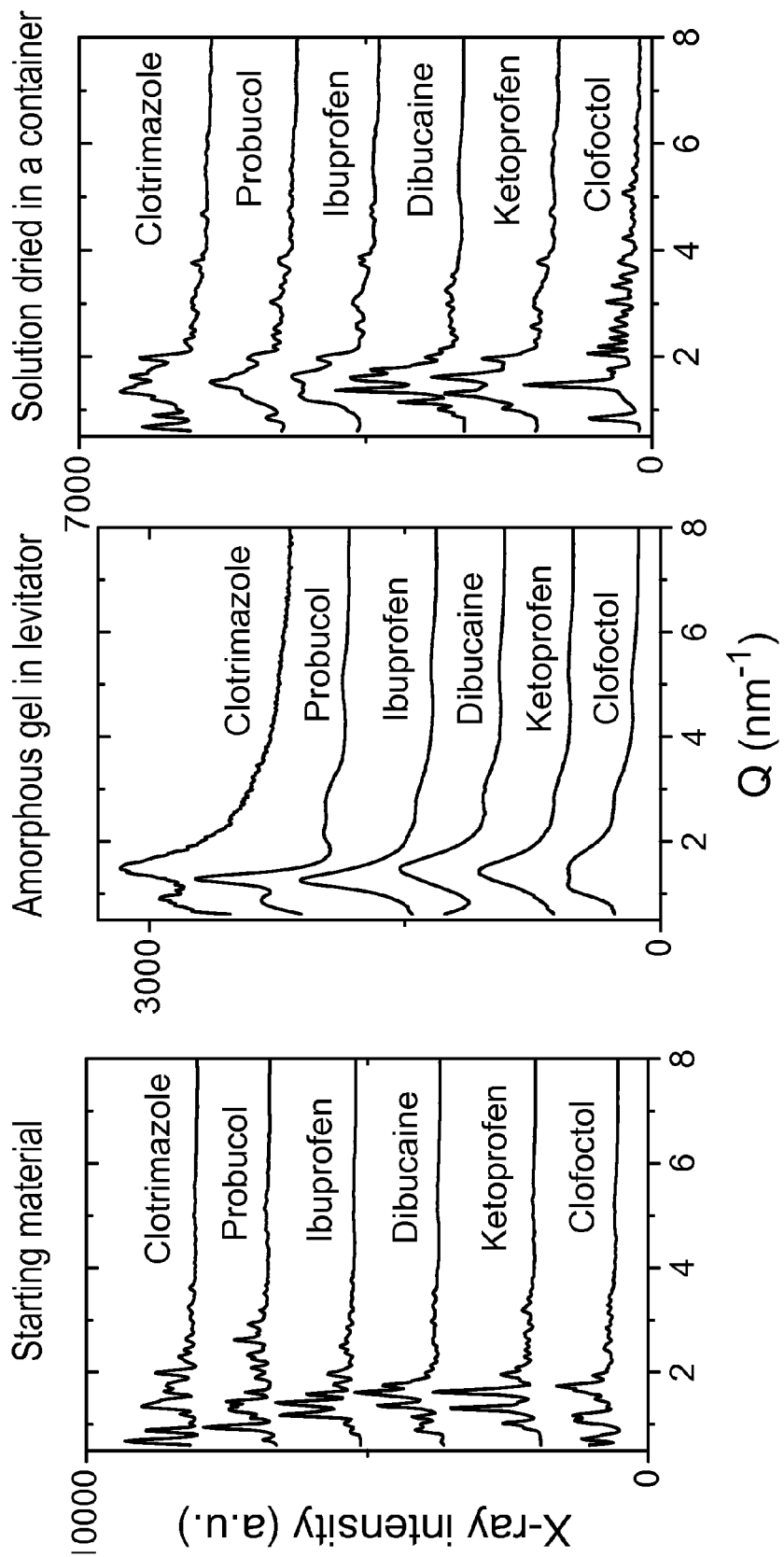
FIG. 7 depicts comparison of X-ray diffraction patterns of amorphous and crystallized phases of selected drugs.

FIG. 7 compares the x-ray diffraction patterns of pharmaceuticals processed by the invented weightless system with those processed using conventional method (i.e., in reaction containers). The middle panel of the figure depicts smooth curves, indicative of amorphous materials. The right panel depicts sharp peaks, indicative of crystal presence.

In another embodiment of the invented process pH of materials within the containerless environment are modifiable in situ by equilibrating those droplets with an appropriate moiety (such as ammonia in instances where an increase is desired, or $CO_2$ or $SO_2$ in instances where a decrease in pH is sought). In an embodiment of this in situ chemistry process, pH modification is done during evaporation of the solvent, or concomitant with a phase change of the feedstock during amorphous material synthesis. The species used to control pH may be introduced as a gas surrounding the levitated drop or via an adjacent drop.

Non-contact control of pH can be achieved by exposing a levitated drop to gaseous moieties, such as $NH_3$, $CO_2$, $SO_2$, and combinations thereof. In an embodiment of this in situ process, pH changing moieties lighter than air are positioned below the levitated sample in need of pH adjusting while pH changing moieties heavier than air are positioned above the levitated sample in need of pH adjustment. The acoustic field provides motion of the gas around the levitated drop. In the case of laser heating, the drop also expands and contracts in a radial direction. This facilitates homogeneous mixing and in some cases chemical equilibration of a liquid drop and a reactive gaseous atmosphere.

Also, given the surprising finding that levitation causes amorphous materials to be formed from low molecular weight compounds, i.e., less than 1000 Daltons, the invented process is useful as an analytical screening tool to characterize various physical and chemical parameters for amorphous compound synthesis. Then, in scaling up the empirically determined protocol, transient containerless processing can be employed, for example drop tubes, to produce the new amorphous material in bulk.

Structure Determination Detail

The structure of the starting crystalline materials, the supersaturated samples processed in the levitator, and the in-situ progress of the evaporation experiments were measured using the 115 keV x-ray diffraction beam line 11-ID-C at the Advanced Photon Source, located at Argonne National Laboratory, Argonne, Ill. X-rays with an incident wavelength of 0.10798 Å were used and the scattered x-ray intensity was measured with a flat plate a-Si Perkin Elmer area detector (model XRD 1621). Generally, radiations greater than 40 keV are suitable to provide bulk structure detail of materials about a millimeter or two in size.

This imaging method enabled the structural evolution of the material to be monitored in real time. The data were acquired from levitated samples in two minute duration sets. The in-situ measurements were taken for periods of up to 20 minutes for most samples, although the aging and drying of the amorphous gels were monitored for up to 10 hours for Probucol and 14 hours for Ibuprofen.

FIG. 8 is a depiction of an x-ray beam arrangement for analyzing material structures formed via the invented process. FIG. 8 depicts a two transducer 11 levitation system. Generally, a sample 14 is positioned between the horns 11 of a levitator so as to be heated or otherwise contacted by a laser beam 34 or plurality of beams. Suitable laser beams are available commercially such as for example, a modified Cryostream plus with additional gas heater (Bruker AXS, Madison, Wis.). Positioning of the levitator to optimize its effect on the sample is facilitated with the mounting of at least one of the transducers of the levitator on a base plate 38 actuated by a precision motor-driven X-Y-Z translation stage.

The temperature of the heated sample is monitored by a thermocouple 35, optical pyrometry, or other temperature measuring means. An infrared thermal imaging camera 36 and video camera record the extent of transformation.

An x-ray beam is directed at the sample to determine the extent of its glassy structure. Both an x-ray area detector 22 and an x-ray beam backstop provide an input feedback for determining the transformed structure of the laser-treated sample.

Many modifications may be made to adapt a particular situation or material to the teachings of the invention without departing from its scope. Additional disclosure is found in C. J. Benmore et al, *Physical Review X* 1, 011004 (2001), the entirety of which is incorporated herein by reference.

While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

The present methods can involve any or all of the steps or conditions discussed above in various combinations, as desired. Accordingly, it will be readily apparent to the skilled artisan that in some of the disclosed methods certain steps can be deleted or additional steps performed without affecting the viability of the methods.

As will be understood by one skilled in the art, for any and all purposes, particularly in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into sub-ranges as discussed above. In the same manner, all ratios disclosed herein also include all sub-ratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A method for producing neat amorphous compounds, the method comprising:
   a. creating a solution containing a solute material to be amorphized, wherein the solute is dissolved in a solvent; and
   b. while preventing the solution from contacting a solid surface, allowing at least a portion of the solvent to evaporate at a rate sufficient to prevent crystallization of the solute, such that the solute is between 90 and 100 percent amorphous, wherein evaporation occurs at ambient pressure.

2. The method as recited in claim 1 wherein the amorphous compounds have a molecular weight of approximately between 100 Daltons and 7000 Daltons.

3. The method as recited in claim 1 wherein the solid surface is greater than 100 micrometers in diameter.

4. The method as recited in claim 1 wherein evaporation occurs while subjecting the solution to a process selected from the group consisting of acoustic levitation, aerodynamic levitation, free fall in a drop tube, a gravity free environment, and combinations thereof.

5. The method as recited in claim 1 further comprising cooling the solute to form solids.

6. The method as recited in claim 4 wherein the solid is more than 50 percent noncrystalline.

7. The method as recited in claim 1 wherein a solvated complex is formed after evaporation.

8. The method as recited in claim 1 further comprising a means for varying the pH of the material.

9. The method of claim 1 further comprising the step of controlling the rate of evaporation by adjusting the ambient temperature around the solution.

10. The method of claim 1 further comprising the step of quenching the resulting solution in a liquid quenchant.

11. The method of claim 1 further comprising the step of storing the resulting solution at or below the glass transition temperature of the material to be amorphized.

12. The method as recited in claim 1 wherein the solute is between about 95 and 100 percent amorphous.

13. The method as recited in claim 1 wherein the amorphous compounds are neat and single phase.

* * * * *